US 7,872,457 B2

(12) United States Patent  (10) Patent No.: US 7,872,457 B2
Takemura  (45) Date of Patent: Jan. 18, 2011

(54) SYNCRONOUS SWITCHING REGULATOR CONTROL CIRCUIT

(75) Inventor: Ko Takemura, Kitakyushu (JP)

(73) Assignee: Rohm Co., Ltd. (JP)

( * ) Notice: Subject to any disclaimer, the term of this patent is extended or adjusted under 35 U.S.C. 154(b) by 0 days.

(21) Appl. No.: 12/723,925

(22) Filed: Mar. 15, 2010

(65) Prior Publication Data

US 2010/0181981 A1    Jul. 22, 2010

Related U.S. Application Data

(63) Continuation of application No. 11/666,671, filed as application No. PCT/JP2005/017350 on Sep. 21, 2005, now Pat. No. 7,714,549.

(30) Foreign Application Priority Data

Oct. 29, 2004  (JP) ............................. 2004-316606

(51) Int. Cl.
  *G05F 1/00*    (2006.01)
(52) U.S. Cl. ...................... 323/244; 323/282
(58) Field of Classification Search .............. 323/244, 323/224, 225, 267, 268, 272, 282, 283, 237, 323/271; 307/16, 18, 34, 52, 58, 75
  See application file for complete search history.

(56) References Cited

U.S. PATENT DOCUMENTS

| 6,628,106 B1 * | 9/2003 | Batarseh et al. ............. 323/222 |
| 6,943,535 B1 * | 9/2005 | Schiff .......................... 323/246 |
| 7,002,325 B2 * | 2/2006 | Harris et al. ................. 323/272 |
| 7,304,459 B2 * | 12/2007 | Kazuma ...................... 323/282 |

FOREIGN PATENT DOCUMENTS

| JP | 49-17203 | 5/1974 |
| JP | 2000-83374 A | 3/2000 |
| JP | 2001-86739 | 3/2001 |
| JP | 2002-252970 | 9/2002 |
| JP | 2003-219638 | 7/2003 |
| JP | 2003-319643 | 11/2003 |
| JP | 2004-173461 A | 6/2004 |
| JP | 2004-208490 | 7/2004 |
| JP | 2004-228713 | 8/2004 |

OTHER PUBLICATIONS

International Search Report for International Application No. PCT/JP2005/017350 mailed Nov. 29, 2005.
Written Opinion of the International Searching Authority for International Patent application No. PCT/JP2005/017350 mailed May 1, 2007.
Japanese Office Action for Patent Application No. 2006-542290 dated Oct. 20, 2009 with English translation.
Chinese Office Action for Application No. 200580034520.3 dated Sep. 5, 2008 with English translation.

* cited by examiner

*Primary Examiner*—Bao Q Vu
*Assistant Examiner*—Nguyen Tran
(74) *Attorney, Agent, or Firm*—Cantor Colburn LLP

(57) ABSTRACT

A switching regulator includes a first switching regulator corresponding to a master channel, and a second switching regulator corresponding to a slave channel. The first switching regulator generates first output voltage Vout1 by a constant on-time system in which on-time is constant. On the other hand, the second switching regulator monitors a first switching signal and a second on-time control circuit determines on-time of a second switching signal in accordance with lapse time from the rising time of the first switching signal to the rising time of a second switching signal.

7 Claims, 8 Drawing Sheets

SYNCRONOUS SWITCHING REGULATOR CONTROL CIRCUIT

CROSS REFERENCE TO RELATED APPLICATIONS

This is a continuation application of application Ser. No. 11/666,671 filed on 30 Apr. 2007. Application Ser. No. 11/666,671 is a U.S. national stage of application No. PCT/JP2005/017350, filed on 21 Sep. 2005. Priority under 35 U.S.C. §119(a) and 35 U.S.C. §365(b) is claimed from Japanese Application No. 2004-316606, filed 29 Oct. 2004, the disclosure of which is also incorporated herein by reference.

BACKGROUND OF THE INVENTION

1. Field of the Invention

The present invention relates to a power supply apparatus and, more particularly, to a switching regulator.

2. Description of the Related Art

In various electronic devices, in order to supply a proper voltage to an electronic circuit internally used, a step-up-type or step-down-type DC/DC converter such as a switching regulator is widely used. Such a switching regulator has a switching regulator control circuit for generating a switching signal for controlling on/off of a switching element.

As a switching signal, a PWM (Pulse Width Modulation) signal having a constant frequency for turning on/off the switching element in accordance with a pulse width is widely used (refer to Patent Documents 1 and 2). In a constant frequency system using such a PWM signal, a period since a switching element is turned on until it is turned on next is made constant to a cycle time given by the inverse number of a switching frequency. Consequently, there is a problem that the system cannot follow a load fluctuation and a fluctuation in the input voltage higher than the switching frequency, and an output is accordingly unstable.

To address an application requesting high-speed load response, a system in which the pulse width of a switching signal, that is, on-time Ton is constant and a timing at which the switching signal becomes the high level or the frequency is changed (hereinafter, referred to as constant on-time system) is considered. The constant on-time system can respond to the load fluctuation and input voltage fluctuation at higher speed as compared with the constant frequency system.

[Patent Document 1] Japanese Patent Application Laid-open No. 2003-219638

[Patent Document 2] Japanese Patent Application Laid-open No. 2003-319643

There is a case that an electronic device on which such a switching regulator is mounted needs a plurality of different voltages, and a step-down switching regulator is provided with a plurality of channels, drops the same input voltage at different dropping ratios, and outputs the dropped voltages. In this case, switching signals in a plurality of channels are turned on simultaneously. When switching elements of the channels are turned on simultaneously, an instantaneous value of input current supplied from an input power source for supplying input voltage suddenly increases. When fluctuations of the input current of the step-down switching regulator increase, the current capacitance of the input power source has to be increased or the capacitance of an input capacitor for smoothing has to be increased. Further, when the input current increases instantaneously, switching noise increases. It causes problems of erroneous operation of peripheral circuits and increase in EMI (Electro Magnetic Interference).

The problems will be considered with respect to switching regulators of two systems. The duty ratio "Duty" of the step-down switching regulator is given by the relation Vout/Vin (Duty=Vout/Vin) in a steady state. In the constant frequency system using the PWM signal, switching signals of a plurality of channels can be generated from a single oscillator, and the frequency of the plurality of switching signals can be the same irrespective of the duty ratio. Consequently, synchronization among the plurality of channels can be easily obtained, and the timing at which the switching signal is turned on can be easily shifted. On the other hand, in the case of a switching regulator of the constant on-time system, when the on-times Ton of switching signals in channels are set to be equal, the frequencies of the switching signals change as the duty ratio changes. It becomes difficult to obtain synchronization of the channels, and there is the possibility that a plurality of switching signals are turned on simultaneously. Therefore, in the case of using switching regulator of the constant on-time system in a plurality of channels, a problem of increase in the input current or EMI increases occurs.

SUMMARY OF THE INVENTION

The present invention has been achieved in view of the problems and a general purpose of the invention is to provide a switching regulator of constant on-time system in which synchronous control can be performed among a plurality of channels.

An embodiment of the present invention relates to a switching regulator control circuit. The switching regulator control circuit includes: a first switching signal generating circuit which generates a first switching signal for driving a first switching element connected to a first output circuit; and a second switching signal generating circuit which generates a second switching signal for driving a second switching element connected to a second output circuit. The first switching signal generating circuit changes a timing at which the first switching signal is turned on so that first output voltage output from the first output circuit becomes close to predetermined first reference voltage while making on-time of the first switching signal predetermined constant first on-time. On the other hand, the second switching signal generating circuit changes on-time of the second switching signal so that frequency of the second switching signal becomes close to frequency of the first switching signal, and changes a timing at which the second switching signal is turned on so that second output voltage output from the second output circuit becomes close to predetermined second reference voltage.

According to the embodiment, by adjusting the on-time of the second switching signal, the switching signals generated by the first and second switching signal generating circuits can be synchronized.

The second switching signal generating circuit may detect lapse time from the rising edge of the first switching signal to the rising edge of the second switching signal, and change the on-time of the second switching signal so that the lapse time becomes close to a predetermined target value. By making the lapse time from the rising edge of the first switching signal to the rising edge of the second switching signal constant, the frequency of the first switching signal and that of the second switching signal can be brought close to each other.

The second switching signal generating circuit may make the on-time of the second switching signal shift temporally from the on-time of the first switching signal. By shifting the on-times of the switching signals temporally, the first and second switching elements can be prevented from being turned on simultaneously.

The second switching signal generating circuit may set the predetermined target value so that the on-time of the second switching signal does not overlap the on-time of the first switching signal. By adjusting the lapse time from the rising edge of the first switching signal to the rising edge of the second switching signal, two switching signals can be prevented from being turned on simultaneously.

The first switching signal generating circuit includes: a first voltage comparator which compares the first output voltage with the first reference voltage; a first flip flop which is set according to an output of the first voltage comparator; and a first on-time control circuit which resets the first flip flop after lapse of the first on-time from the rising edge of an output of the first flip flop, and may output an output of the first flip flop as the first switching signal. On the other hand, the second switching signal generating circuit includes: a second voltage comparator which compares the second output voltage with the second reference voltage; a second flip flop which is set according to an output of the second voltage comparator; and a second on-time control circuit which resets the second flip flop after lapse of the second on-time from the rising edge of an output of the second flip flop, and may output an output of the second flip flop as the second switching signal, and the second on-time control circuit may detect lapse time from the rising edge of the first switching signal until the rising edge of the second switching signal, and change the second on-time so that the lapse time becomes close to a predetermined target value.

In the second switching signal generating circuit, the rising edge of the first switching signal and that of the second switching signal are detected and, according to the lapse time, the on-time of the second switching signal is increased/decreased, thereby changing the timing at which the second switching signal is turned on next. In such a manner, the cycle time, that is, the frequency is adjusted, and the second switching signal can be synchronized with the first switching signal.

Since the on-time of the first switching signal is constant, "detection of the lapse time from the rising edge of the first switching signal to the rising edge of the second switching signal" is equivalent to detection of lapse time from the trailing edge of the first switching signal to the rising edge of the second switching signal.

In the second switching signal generating circuit, the second on-time control circuit may shorten the on-time of the second switching signal when the lapse time from the rising edge of the first switching signal to the rising edge of the second switching signal is short, and increase the on-time of the second switching signal when the lapse time is long.

The second on-time control circuit may include: a timer circuit which flows constant current to a capacitor and measuring, as the on-time of the second switching signal, lapse time until voltage reaches predetermined voltage; and an on-time correction circuit which increases/decreases the value of the constant current in the timer circuit on the basis of lapse time from the rising edge of the first switching signal to the rising edge of the second switching signal.

By changing the value of the constant current for charging the capacitor in the timer circuit, when the constant current is increased, the on-time of the second switching signal can be shortened. When the constant current is decreased, the on-time of the second switching signal can be increased.

The on-time correction circuit may decrease the constant current when the lapse time from the rising edge of the first switching signal to the rising edge of the second switching signal is short, and increase the constant current when the lapse time from the rising edge of the first switching signal to the rising edge of the second switching signal is long.

The on-time correction circuit may set a correction amount of the constant current to zero when the lapse time from the rising edge of the first switching signal to the rising edge of the second switching signal is about the half of the cycle time of the first switching signal.

Another embodiment of the present invention relates to a switching regulator. The switching regulator has the switching regulator control circuit and a switching element which is turned on/off by the switching regulator control circuit.

Further another embodiment of the present invention relates to a switching signal generating apparatus. The apparatus includes: a first switching signal generating circuit which generates a first switching signal for driving a first switching element; and a second switching signal generating circuit which generates a second switching signal for driving a second switching element. The first switching signal generating circuit changes a timing at which the first switching signal is turned on so that first voltage to be controlled becomes close to predetermined first reference voltage, the first voltage being obtained as a result of switching of the first switching element, while making on-time of the first switching signal a predetermined constant first on-time. On the other hand, the second switching signal generating circuit changes on-time of the second switching signal so that frequency of the second switching signal becomes close to frequency of the first switching signal, and second voltage to be controlled becomes close to predetermined second reference voltage, the second voltage being obtained as a result of switching of the second switching element.

According to the embodiment, a plurality of switching elements driven by pulse signals can be synchronously controlled.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
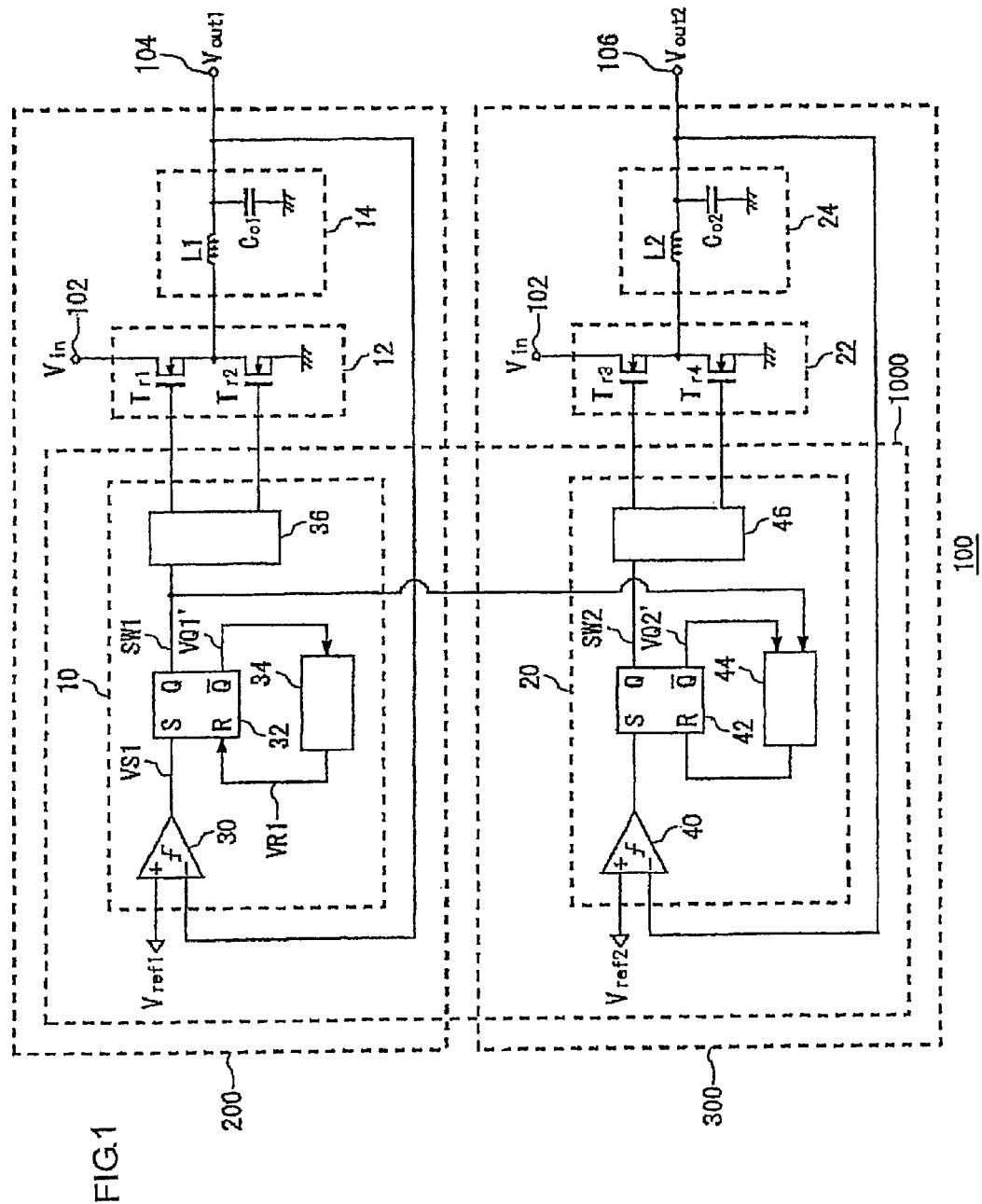
FIG. 1 is a circuit diagram showing the configuration of a switching regulator according to an embodiment.
Figure 8:
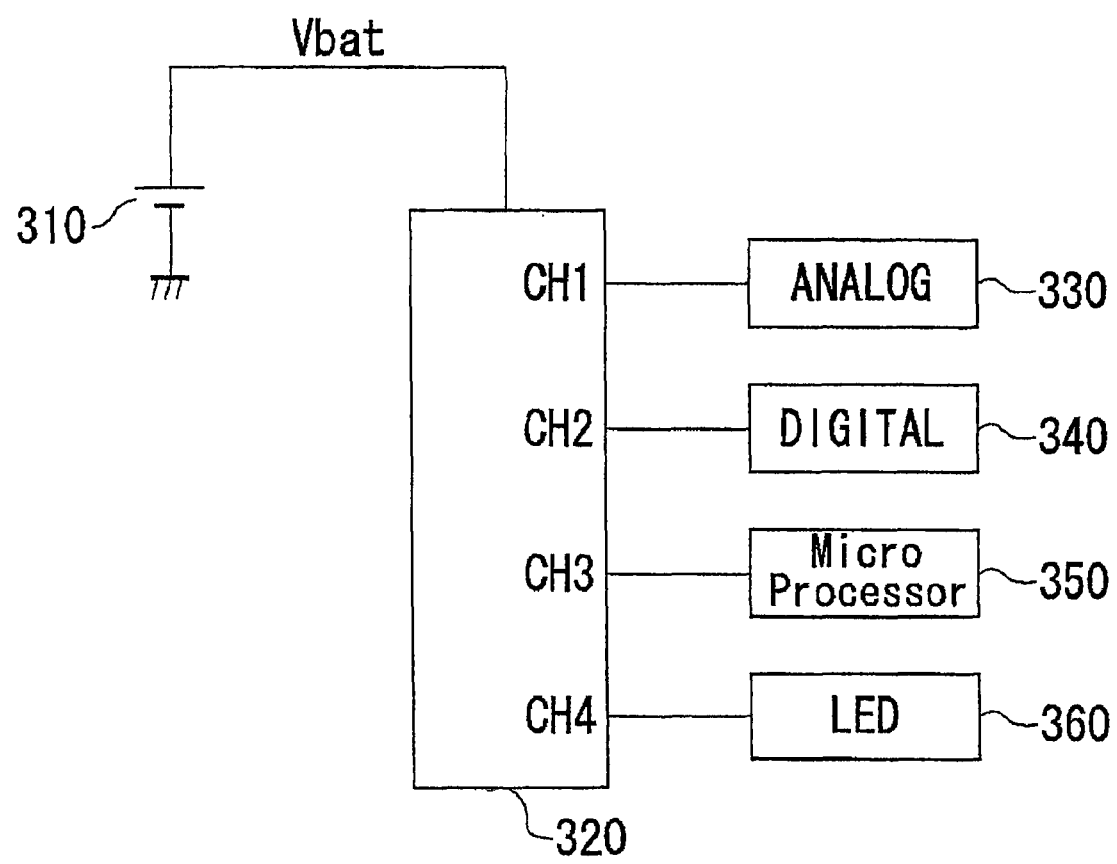
FIG. 8 is a block diagram showing the configuration of an electronic device on which the switching regulator of FIG. 1 is mounted.

FIG. 1 shows the configuration of a switching regulator 100 according to an embodiment of the invention. In the following diagrams, the same reference numerals are designated to the same components and repetitive description will not be given. FIG. 8 is a block diagram showing the configuration of an electronic device 400 on which the switching regulator 100 of FIG. 1 is mounted. The electronic device 400 is, for example, a personal computer, a digital appliance, or a battery-powered small-sized information terminal such as a portable telephone terminal, a CD player, or a PDA. In the following embodiments, the electronic device 400 will be described as a cellular phone terminal.

The electronic device 400 includes a battery 310, a power supply apparatus 320, an analog circuit 330, a digital circuit 340, a microprocessor 350, and an LED 360. The battery 310 is, for example, a lithium ion battery and outputs about 3V to 4V as a battery voltage Vbat that is a DC voltage. The analog circuit 330 includes a circuit block having a power amplifier, an antenna switch, an LNA (Low Noise Amplifier), a mixer, or a high frequency circuit such as a PLL (Phase Locked Loop) and stably operating on a power supply voltage Vcc of about 3.4V. The digital circuit 340 also includes a circuit block having various DSPs (Digital Signal Processors) and stably operating on a power supply voltage Vdd of about 3.4V. The microprocessor 350 is a block for controlling the whole electronic device 400 in a centralized manner and operating at a power supply voltage of 1.5V. The LED 360 includes LEDs (Light Emitting Diodes) of three colors of R, G, and B and is used as a backlight of a liquid crystal or illumination. For driving the LED 360, a drive voltage of 4V or higher is required.

The power supply apparatus 320 is a multi-channel switching power supply including a plurality of switching regulators for dropping or boosting the battery voltage Vbat as necessary on the channel unit basis, and supplying proper power supply voltages to the analog circuit 330, the digital circuit 340, the microprocessor 350, and the LED 360. In such a power supply apparatus 320, in the case where the channels perform the switching operations asynchronously, the switching elements of the channels may turn on simultaneously. Consequently, the input current from the battery 310 instantaneously increases, and a problem occurs such that the EMI increases.

By using the switching regulator 100 of FIG. 1 according to the embodiment for a multi-channel power supply apparatus as shown in FIG. 8, the switching operations of the channels are synchronized. Thus, a problem such as EMI can be solved. Referring again to FIG. 1, the configuration of the switching regulator 100 according to the embodiment will be described in detail.

The switching regulator 100 according to the embodiment is a step-down-type DC/DC converter including a master channel and a slave channel and outputting two output voltages. The switching regulator 100 includes a first switching regulator 200 corresponding to the master channel, and a second switching regulator 300 corresponding to the slave channel, and has an input terminal 102, a first output terminal 104, and a second output terminal 106. Each of the first and second switching regulators 200 and 300 drops an input voltage Vin input to the input terminal 102, outputs a first output voltage Vout1 from the first output terminal 104, and outputs a second output voltage Vout2 from the second output terminal 106.

The switching regulator 100 includes a first switching element 12, a second switching element 22, a first output circuit 14 connected to the first switching element 12, a second output circuit 24 connected to the second switching element 22, and a switching regulator control circuit 1000 for generating switching signals. The switching regulator control circuit 1000 includes: a first switching signal generating circuit 10 for generating a first switching signal SW1 for driving the first switching element 12, and a second switching signal generating circuit 20 for generating a second switching signal SW2 for driving the second switching element 22, which are integrated.

The first switching regulator 200 includes the first switching signal generating circuit 10, the first switching element 12, and the first output circuit 14. Similarly, the second switching regulator 300 includes the second switching signal generating circuit 20, the second switching element 22, and the second output circuit 24. Since the configurations and operations of the first switching regulator 200 and second switching regulator 300 are similar, the first switching regulator 200 will be described below.

The first output circuit 14 includes a first inductor L1 and a first output capacitor Co1 and is connected to the first switching element 12. The first switching element 12 includes a first main transistor Tr1 and a first synchronous rectifier transistor Tr2 connected in series between the input terminal 102 and the ground potential and performed on/off control by drive signals input to the gate terminals of the first main transistor Tr1 and the first synchronous rectifier transistor Tr2.

The first main transistor Tr1 and the first synchronous rectifier transistor Tr2 are alternatively turned on/off, thereby supplying current to the first inductor L1 alternately via the first main transistor Tr1 and the first synchronous rectifier transistor Tr2, and the input voltage Vin is dropped. The first inductor L1 and the first output capacitor Co1 forming the first output circuit is a low pass filter, smooth the first output voltage Vout1, and output the smoothed voltage from the first output terminal 104.

The first switching signal generating circuit 10 includes a first voltage comparator 30, a first flip flop 32, a first on-time control circuit 34, and a first drive circuit 36.

The first switching signal generating circuit 10 generates the first switching signal SW1 for driving the first switching element 12 and, on the basis of the first switching signal SW1, drives the first switching element 12. In the first switching signal generating circuit 10, on-time Ton of the first switching signal SW1 generated by the first switching signal generating circuit 10 is constant, and the first switching signal SW1 is a pulse signal whose turn-on timing, that is, frequency changes.

The first switching signal generating circuit 10 generates a switching signal whose on-time is constant by the first voltage comparator 30, the first flip flop 32, and the first on-time control circuit 34.

The first voltage comparator 30 compares a first reference voltage Vref1 and the first output voltage Vout1, and outputs a high-level signal when the relation Vref1>Vout1 is satisfied, and outputs a low-level signal when the relation Vref1<Vout1 is satisfied. An output VS1 of the first voltage comparator 30 is input to a set terminal S of the first flip flop 32. Therefore, the first flip flop 32 keeps the high level of the first switching signal SW1 as its output signal during the period since the first flip flop 32 is set when the relation Vref1>Vout1 is satisfied until the first flip flop 32 is reset.

Figure 2:
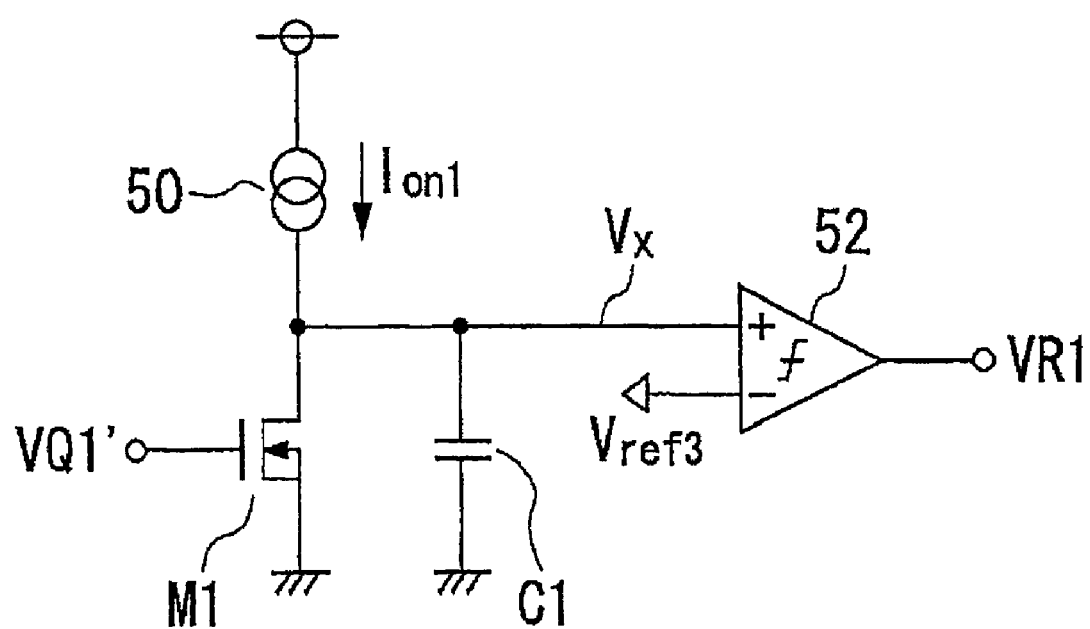
FIG. 2 is a circuit diagram showing the configuration of a first on-time control circuit.

To the first on-time control circuit 34, an inversion output VQ1' of the first flip flop 32 is input. After a lapse of predetermined time since the first flip flop 32 is set, the first flip flop 32 is reset. FIG. 2 is a circuit diagram showing the configuration of the first on-time control circuit 34.

The first on-time control circuit 34 is a timer circuit for flowing constant current to the capacitor and measures a lapse time until a voltage reaches a predetermined voltage. The first on-time control circuit 34 includes a first transistor M1, a first capacitor C1, a third voltage comparator 52, and a first constant current source 50.

The inversion output VQ1' of the first flip flop 32 is input to the gate of the first transistor M1. When the first output voltage Vout1 becomes lower than the first reference voltage Vref1 and the first flip flop 32 is set, the inversion output VQ1' becomes the low level, and the first transistor M1 is turned off.

When the first transistor M1 is on state, the first constant current Ion1 generated by the first constant current source 50 flows to the ground via the first transistor M1. When the first transistor M1 is off state, the first capacitor C1 is charged with the first constant current Ion.

Specifically, when the first output voltage Vout1 becomes lower than the first reference voltage Vref1 and the first flip flop 32 is set, the inversion output VQ1' is switched from the high level to the low level, and charging of the first capacitor C1 with the first constant current Ion1 starts.

A voltage Vx appearing at the first capacitor C1 is given by the relation Vx=Ion1/C1×t using a lapse time "t" since the start of charging, that is, a lapse time "t" since the first flip flop 32 is set. The third voltage comparator 52 compares the voltage Vx with a third reference voltage Vref3. When the relation Vx<Vref3 is satisfied, the third voltage comparator 52 outputs a low-level signal. When the relation Vx>Vref3 is satisfied, the third voltage comparator 52 outputs a high-level signal. The first on-time control circuit 34 operates as a timer circuit for measuring time since the first flip flop 32 is set and, after a period until the voltage Vx reaches the third reference voltage Vref3, that is, a predetermined period given by the relation Ton1=C1×Vref3/Ion1, sets its output to the high level. As will be described later, the period Ton1 corresponds to on-time of the first switching signal SW1. Hereinafter, the predetermined period Ton1 will be called first on-time.

Referring again to FIG. 1, an output VR1 of the first on-time control circuit 34 is input to the reset terminal of the first flip flop 32. Consequently, the first flip flop 32 is reset again after a lapse of the first on-time Ton1 since it is set. As a result, the output SW1 of the first flip flop 32 becomes the high level for the first on-time Ton1 counted by the first on-time control circuit 34.

Setting of the first on-time Ton1 in the first on-time control circuit 34 in FIG. 2 will now be described.

As described above, the first on-time Ton1 of the first switching signal SW1 is determined by the first on-time control circuit 34 and given as the relation Ton1=C1×Vref3/Ion1. The third reference voltage Vref3 is set so as to be equal to or proportional to the first reference voltage Vref1 as a target value of the first output voltage Vout1. Further, the value of the first constant current Ion1 is set so as to be proportional to the input voltage Vin. As a result, the relations Vref3=Vref1× b1 and Ion1=Vin×a1 are satisfied. It is understood that when they are substituted for the first on-time Ton1, the relation Ton1=C1×(Vref1×b1)/(Vin×a1) is satisfied.

On the other hand, the relation Ton1=D1×Tp1 is satisfied between first cycle time Tp1 as the cycle of the first switching signal SW1 and the on-time Ton using the duty ratio D1. The duty ratio D1 in the steady state of the first switching signal SW1 is given as the relation D1=Vref1/Vin. Therefore, the first cycle time Tp1 is expressed as the relation Tp1=Ton1× Vin/Vref1. When the on-time Ton1 is substituted for the first cycle time Tp1, the relation Tp1=C1×(Vref1×b1)/(Vin×a1)× Vin/Vref1=C1×b1/a1 is obtained. That is, in the case where a setting is made so that the first constant current Ion1 is proportional to the input voltage Vin and the third reference voltage Vref3 is proportional to the first reference voltage Vref1, the first cycle time Tp1 or frequency fp1 given by the inverse number of the first cycle time Tp1 can be made constant irrespective of the target values of the input voltage Vin and the first output voltage Vout1.

Figure 3:
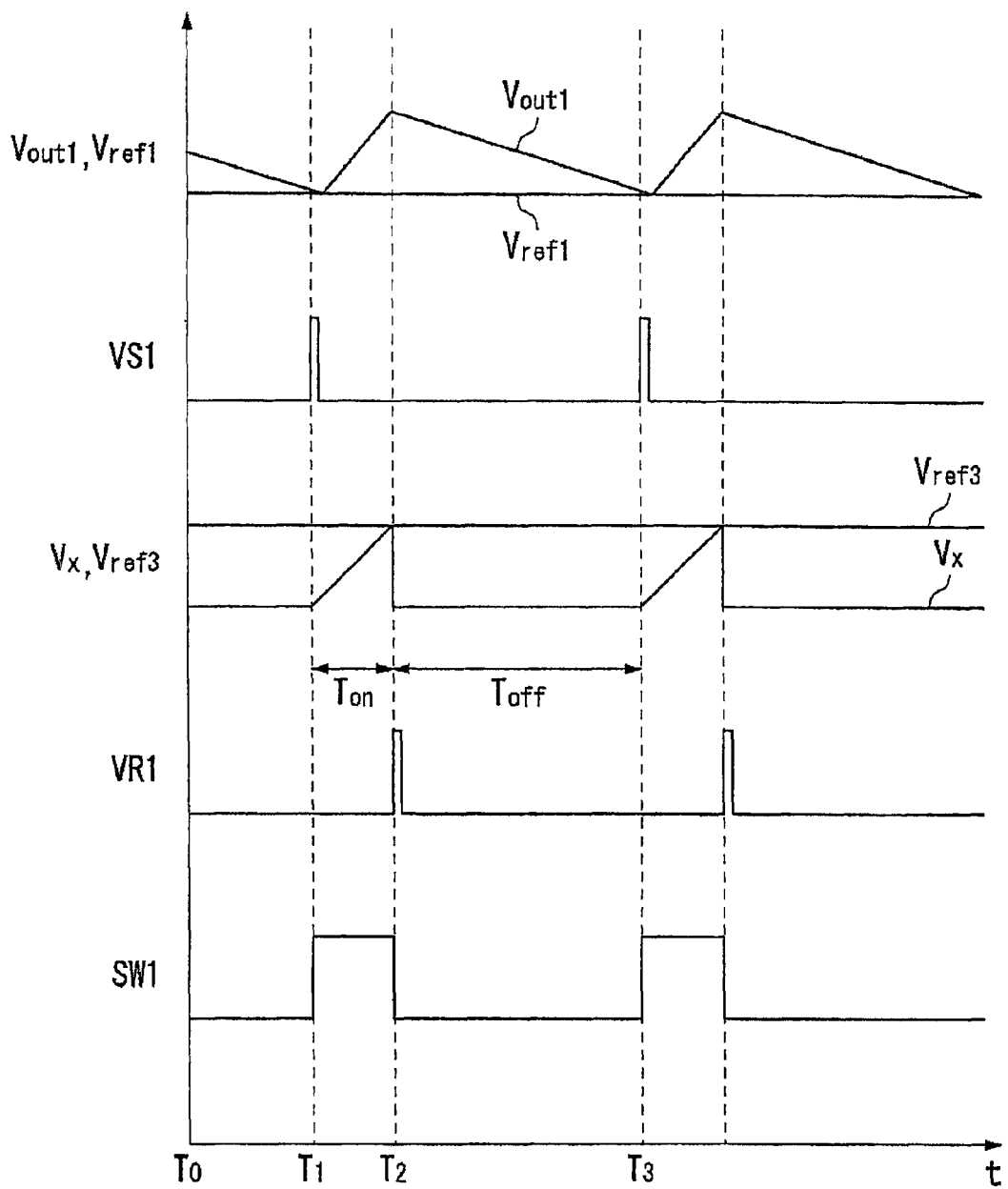
FIG. 3 is a time chart showing signal waveforms of a first switching regulator.

FIG. 3 is a time chart showing signal waveforms of the first switching regulator 200. In the time chart, the axis of ordinate and the axis of abscissa are shown in scales different from actual ones for easier understanding and viewability.

For a period from time T0 to time T1 at which the first switching signal SW1 is off state, the first output voltage Vout1 gradually decreases. When the first output voltage Vout1 becomes lower than the first reference voltage Vref1 as a target value at the time T1, the output VS1 of the first voltage comparator 30 becomes the high level, and the first flip flop 32 is set.

The first on-time control circuit 34 measures time lapsed since the first flip flop 32 is set. In the first on-time control circuit 34, when the voltage Vx rises and becomes higher than the third reference voltage Vref3 at time T2 after a lapse of the first on-time Ton1 from the time T1, output VR1 of the third voltage comparator 52 becomes the high level, and the first flip flop 32 is reset. During the on-time of the first switching signal SW1 from the time T1 to the time T2, the first output voltage Vout1 rises. After that, when the first switching signal SW1 is turned off, the first output voltage Vout1 starts decreasing again and becomes lower than Vref1 (Vout1<Vref1) at time T3, and the first flip flop 32 is set again, and the first switching signal SW1 is turned on.

As described above, the first switching signal generating circuit 10 generates the first switching signal SW1 while making the on-time the predetermined constant first on-time Ton1 and changing the on timing so that the first output voltage Vout1 becomes close to the predetermined first reference voltage Vref1.

The first switching signal SW1 is input to the first drive circuit 36, and the first drive circuit 36 generates a drive signal for driving the first switching element 12 on the basis of the first switching signal SW1. In the embodiment, a drive voltage is generated so that the first main transistor Tr1 is turned on in the on-time of the first switching signal SW1 and the first synchronous rectifier transistor Tr2 is turned on in the off time of the first switching signal SW1. As a result, the first output voltage Vout1 is controlled so as to be close to the first reference voltage Vref1.

Referring again to FIG. 1, the second switching regulator 300 as a slave channel will be described. Since the basic configuration and operation of the second switching regulator 300 are similar to those of the first switching regulator 200, the different points will be mainly described below.

The second switching regulator 300 includes the second switching signal generating circuit 20, the second switching element 22, and the second output circuit 24. The configurations and operations of the second switching element 22 and the second output circuit 24 are similar to those of the first switching element 12 and the first output circuit 14, respectively.

The second switching signal generating circuit 20 includes a second voltage comparator 40, a second flip flop 42, a second on-time control circuit 44, and a second drive circuit 46. Since the configurations and operations of the second voltage comparator 40, the second flip flop 42, and the second drive circuit 46 are similar to those of the first switching signal generating circuit 10, the second on-time control circuit 44 will be described below.

The second on-time control circuit 44 resets the second flip flop 42 after a lapse of second on-time Ton2 from the time the second flip flop 42 is set to the time the second switching signal SW2 is to be turned on. To the second on-time control circuit 44, the first switching signal SW1 is input in addition to an inversion output VQ2' of the second flip flop 42 to the second on-time control circuit 44. On the basis of the lapse time from the rising edge of the first switching signal SW1 to the rising edge of the second switching signal SW2, the on-time Tong of the second switching signal SW2 is changed.

Figure 4:
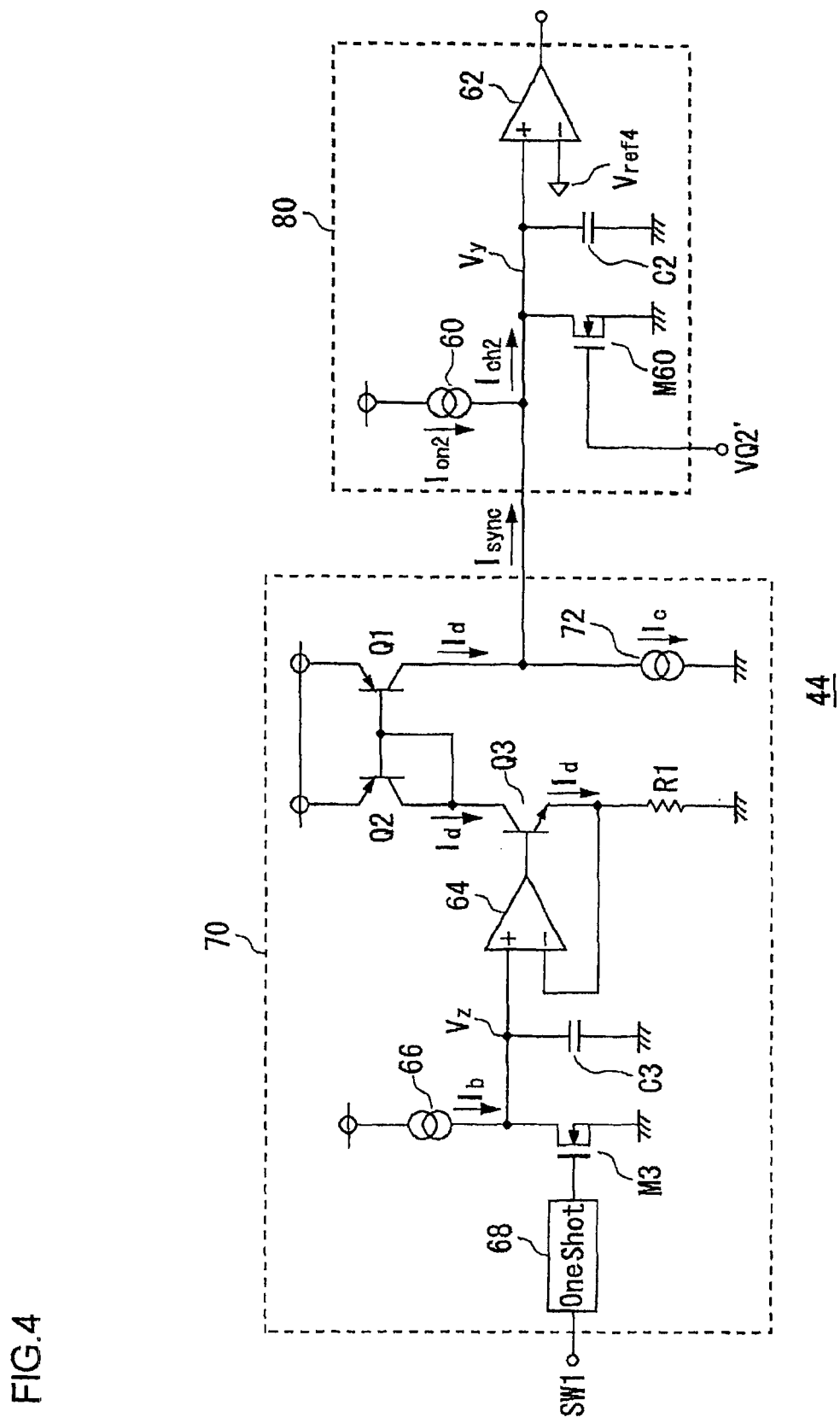
FIG. 4 is a circuit diagram showing the configuration of a second on-time control circuit.

FIG. 4 is a circuit diagram showing the configuration of the second on-time control circuit 44. The second on-time control circuit 44 includes a timer circuit 80 and an on-time correction circuit 70.

The configuration and operation of the timer circuit 80 are similar to those of the first on-time control circuit 34 in FIG. 2. In the diagram, a second capacitor C2 is charged with charging current shown by Ich2 in the diagram, and time required for voltage Vy appearing in the second capacitor C2 to reach predetermined fourth reference voltage Vref4 is measured. Therefore, time measured by the timer circuit 80 is expressed as the relation Ton2=C2×Vref4/Ich2.

The on-time correction circuit 70 outputs synchronous correction current Isync. The charging current Ich2 for charging the second capacitor C2 is given by the sum of second constant current Ion2 output from a second constant current source 60 and the synchronous correction current Isync output from the on-time correction circuit 70, and the relation Ich2=Ion2+Isync is satisfied. Therefore, when the synchronous correction current Isync is positive, the second on-time Ton2 measured by the timer circuit 80 becomes short. When the synchronous correction current Isync is negative, the second on-time Ton2 becomes long. That is, by changing the value of the synchronous correction current Isync, the on-time correction circuit 70 can adjust the second on-time Ton2. In the following, the second on-time will be distinguished as follows. The second on-time when the correction amount Isync=0 will be called reference second on-time Ton2, and the second on-time after correction of the on-time correction circuit 70 will be called corrected second on-time Ton2'.

Also in the second on-time control circuit 44, like the first on-time Ton1 in the first on-time control circuit 34, the reference second on-time Ton2 is set so that second cycle time Tp2 as the cycle of the second switching signal SW2 becomes constant irrespective of the input voltage Vin and second reference voltage as a target value of the output voltage.

Specifically, a setting is made so that the second constant current Ion2 is proportional to the input voltage Vin and the fourth reference voltage Vref4 is proportional to the second reference voltage Vref2 as the target value of the second output voltage Vout2. When the second constant current Ion2 is equal to Vin×a2 and the fourth reference voltage Vref4 is equal to b2×Vref2, the second cycle time Tp2 becomes equal to C2×b2/a2 and can be made constant irrespective of the input voltage Vin and the target value of the second output voltage Vout2.

In the embodiment, constants are determined so that the relation C1×b1/a1=C2×b2/a2 is satisfied in the first on-time control circuit 34 and second on-time control circuit 44. In this case, in an ideal circuit in which power losses in the inductors and capacitors used for the first output circuit 14 and second output circuit 14, the first switching element 12, and the second switching element 22 can be ignored, the first cycle time Tp1 of the first switching signal SW1 and the second cycle time Tp2 of the second switching signal SW2 in the steady state can be made equal to each other, that is, the frequency of the first switching signal SW1 and that of the second switching signal SW2 can be made equal to each other.

In an actual circuit, however, resistive components are included in the elements and the elements have variability. Also in the case where the relation C1×b1/a1=C2×b2/a2 is satisfied, a slight difference occurs between the frequency fp1 of the first switching signal SW1 and the frequency fp2 of the second switching signal SW2.

The on-time correction circuit 70 adjusts the length of the reference second on-time Ton2 of the second switching signal SW2 so that the frequency fp2 of the second switching signal becomes close to the frequency fp1 of the first switching signal. For this purpose, the synchronous correction current Isync is generated on the basis of the lapse time from the rising edge of the first switching signal SW1 to the rising edge of the second switching signal SW2. As shown in FIG. 4, the on-time correction circuit 70 includes a one-shot circuit 68, a third transistor M3, a third constant current source 66, a third capacitor C3, an operational amplifier 64, transistors Q1, Q2, and Q3, and a fourth constant current source 72.

The first switching signal SW1 is input to the one-shot circuit 68. The one-shot circuit 68 continuously holds its output at the high level for a predetermined period since the first switching signal SW1 is turned on. An output of the one-shot circuit 68 is connected to the gate of the third transistor M3 as an N-type MOSFET transistor. When an output of the one-shot circuit 68 becomes the high level, the third transistor M3 is turned on to discharge the third capacitor C3, thereby dropping voltage Vz appearing in the third capacitor C3 to 0V.

The third constant current source 66 is connected to the third capacitor C3 to supply the constant current Ib. The voltage Vz appearing at the third capacitor C3 rises in proportional to time by charging with the constant current Ib and is expressed as the relation Vz=Ib/C3×t using the lapse time "t" from start of the charging. The third capacitor C3 is connected to the non-inverting input terminal of the operational amplifier 64.

The output of the operational amplifier 64 is connected to the base of the transistor Q3, and the inverting input terminal is connected to the emitter of the transistor Q3. A resistor R1 is provided between the emitter of the transistor Q3 and the ground. A feedback is performed so that the voltage of the non-inverting input terminal and that of the inverting input terminal of the operational amplifier 64 become equal to each other. Consequently, the voltage Vz appears at the connection point between the resistor R1 and the transistor Q3. As a result, the current Id given by Vz/R1 flows to the resistor R1.

The transistors Q1 and Q2 form a current mirror circuit, and the fourth constant current source 72 for generating the constant current Ic is connected to the collector of the transistor Q1. As a result, the difference between the constant current Ic and the current Id is output as the synchronous correction current Isync from the on-time correction circuit 70. The synchronous correction current Isync is the function of the lapse time "t" from the rising edge of the first switching signal SW1 and is expressed as the relation Isync(t)=Id−Ic=Vz/R1−Ic=(Ib/C3/R1)×t−Ic.

Since the synchronous correction current Isync is the function of time, the charging current Ich2 is given as the function of time and can be expressed as the relation Ich2(t)=Ion2+Isync(t).

The charging of the second capacitor C2 starts from the rising edge of the second switching signal SW2. When it is assumed that the second switching signal SW2 rises at time t1, the voltage Vy at time t2 is proportional to a value obtained by integrating the charging current Ich2 from the time t1 to the time t2. When it is assumed that the voltage Vy reaches the fourth reference voltage Vref4 at the time t2, the corrected second on-time Ton2' is given by t2−t1.

Since the time at which the first switching signal SW1 rises corresponds to t=0, the time t1 at which the second switching signal SW2 rises corresponds to lapse time from the rising edge of the first switching signal SW1 to the rising edge of the second switching signal SW2.

The corrected second on-time Ton2' is obtained by solving an equation derived by the integration, and changes according to the lapse time t1 from the rising edge of the first switching signal SW1 to the rising edge of the second switching signal SW2. When the lapse time t1 is long, the corrected second on-time Ton2' is long. On the contrary, when the lapse time t1 is short, the corrected second on-time Ton2' is short.

Figure 5:
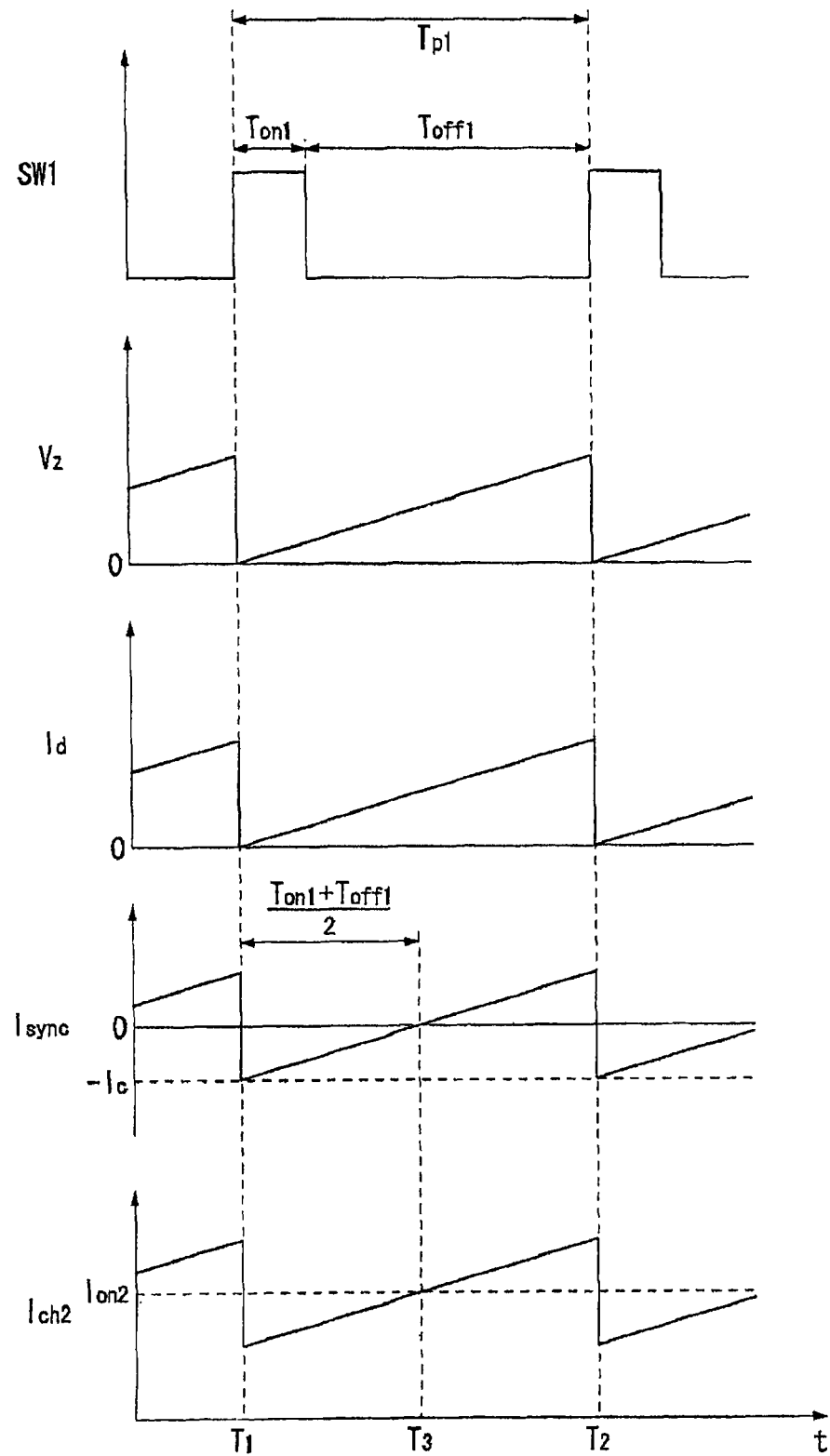
FIG. 5 is a time chart showing signal waveforms of the second on-time control circuit.

FIG. 5 is a time chart showing current and voltage waveforms of the second on-time control circuit 44.

At time T1, the first switching signal SW1 is turned on. At this time, the one-shot circuit 68 is on state for a predetermined period, so that the charge accumulated in the third capacitor C3 are discharged and the voltage Vz appearing at the third capacitor C3 decreases to 0V. When the one-shot circuit 68 is turned off, the third capacitor C3 is charged with the constant current Ib, and the voltage Vz rises at the gradient of Ib/C3. The current Id flowing in the resistor R1 increases with time in proportion to the voltage Vz.

When attention is paid to the synchronous correction current Isync, the relation Isync=Id−Ic is satisfied. Therefore, at the time T1 when the relation Id=0 is satisfied, Isync becomes −Ic that is a negative value. After that, as the current Id increases, the synchronous correction current Isync increases from the negative value to a positive value. The synchronous correction current Isync is adjusted in advance so as to become zero at time T3 after a lapse of Tp1/2 as the half of the cycle time Tp1 of the first switching signal SW1 from the time T1.

The current Id increases with time at the gradient Ib/(C3×R1), and the gradient of the synchronous correction current Isync becomes equal to the gradient Ib/(C3×R1). It is sufficient to increase the synchronous correction current Isync only by Ic in the time Tp1/2 which is the half of the cycle time of the first switching signal SW1. It is therefore sufficient to determine the current value Ib, the resistance R1, and the capacitance value C3 so that the relation Ic=Ib/(C3×R1)× Tp1/2 is satisfied.

In the case where the synchronous correction current Isync is generated in the on-time correction circuit 70 as described above, the charging current Ich2 in the timer circuit 80 becomes current obtained by adding the synchronous correction current Isync that changes with time to the second constant current Ion2 generated by the second constant current source 60.

The operation of the switching regulator 100 having the above configuration will be described. In the following description, it is assumed that the input voltage Vin is 10V, the first reference voltage Vref1 is 2V, and the second reference voltage Vref2 is 2.5V. The duty ratio D1 of the first switching signal SW1 in the steady state is 20%, and the duty ratio D2 of the second switching signal SW2 is 25%.

First, to make the effects of the invention clearer, the operation in the case where the second on-time is not corrected by the on-time correction circuit 70 in the second on-time control circuit 44 will be described.

Figure 6:
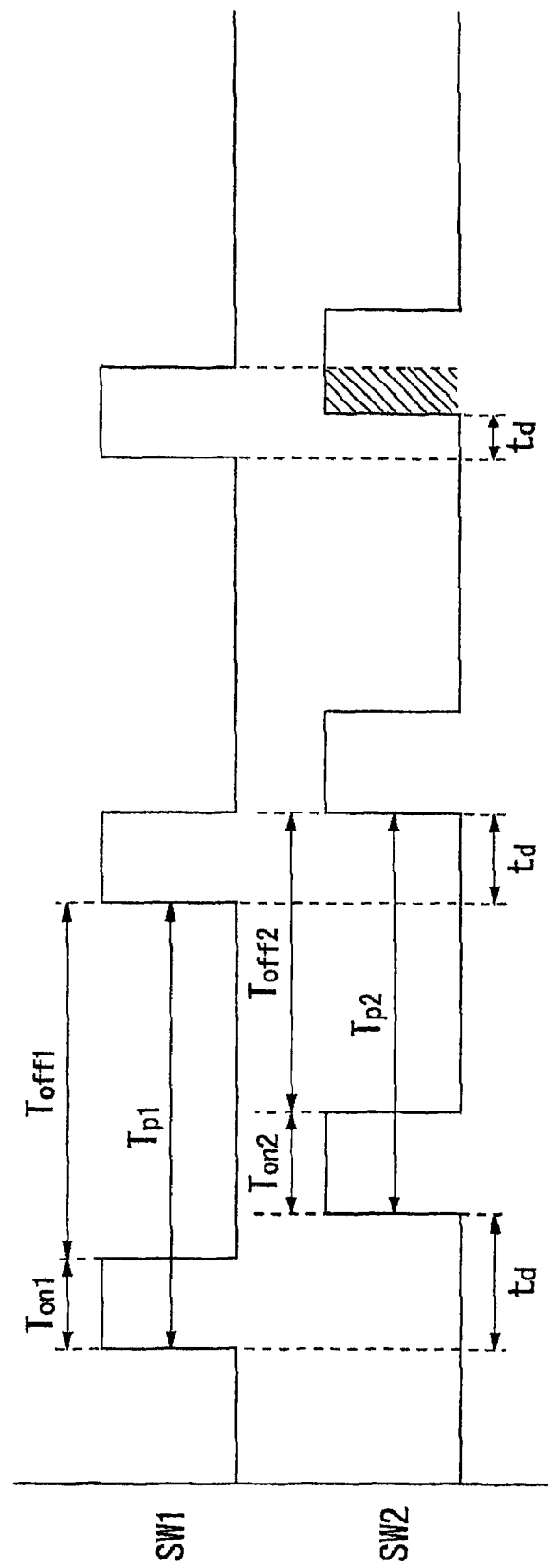
FIG. 6 is a time chart showing signal waveforms of a switching regulator in the case where second on-time is not corrected by an on-time correction circuit in the second on-time control circuit.

FIG. 6 is a time chart showing signal waveforms of the switching regulator 100 in the case where the second on-time is not corrected by the on-time correction circuit 70 in the second on-time control circuit 44.

As described above, it is set so that the frequency of the first switching signal SW1 and that of the second switching signal SW2 become equal to each other in an ideal state in the first on-time control circuit 34 and second on-time control circuit 44. In an actual circuit, however, resistive components are included in the elements in the circuit and the elements also have variability, so that a difference occurs between the cycle times Tp1 and Tp2 of the first switching signal SW1 and second switching signal SW2. Since the on/off operation of the second switching signal SW2 repeats independently of the first switching signal SW1, the lapse time td from the rising edge of the first switching signal SW1 to the rising edge of the second switching signal SW2a (hereinbelow, simply called the lapse time td) varies among cycles. The on-times overlap at timings shown in a hatched portion in FIG. 6, and a problem such as increase in EMI occurs.

Next, the operation performed in the case of correcting the second on-time by the on-time correction circuit 70 in the second on-time control circuit 44 will be described.

Figure 7:
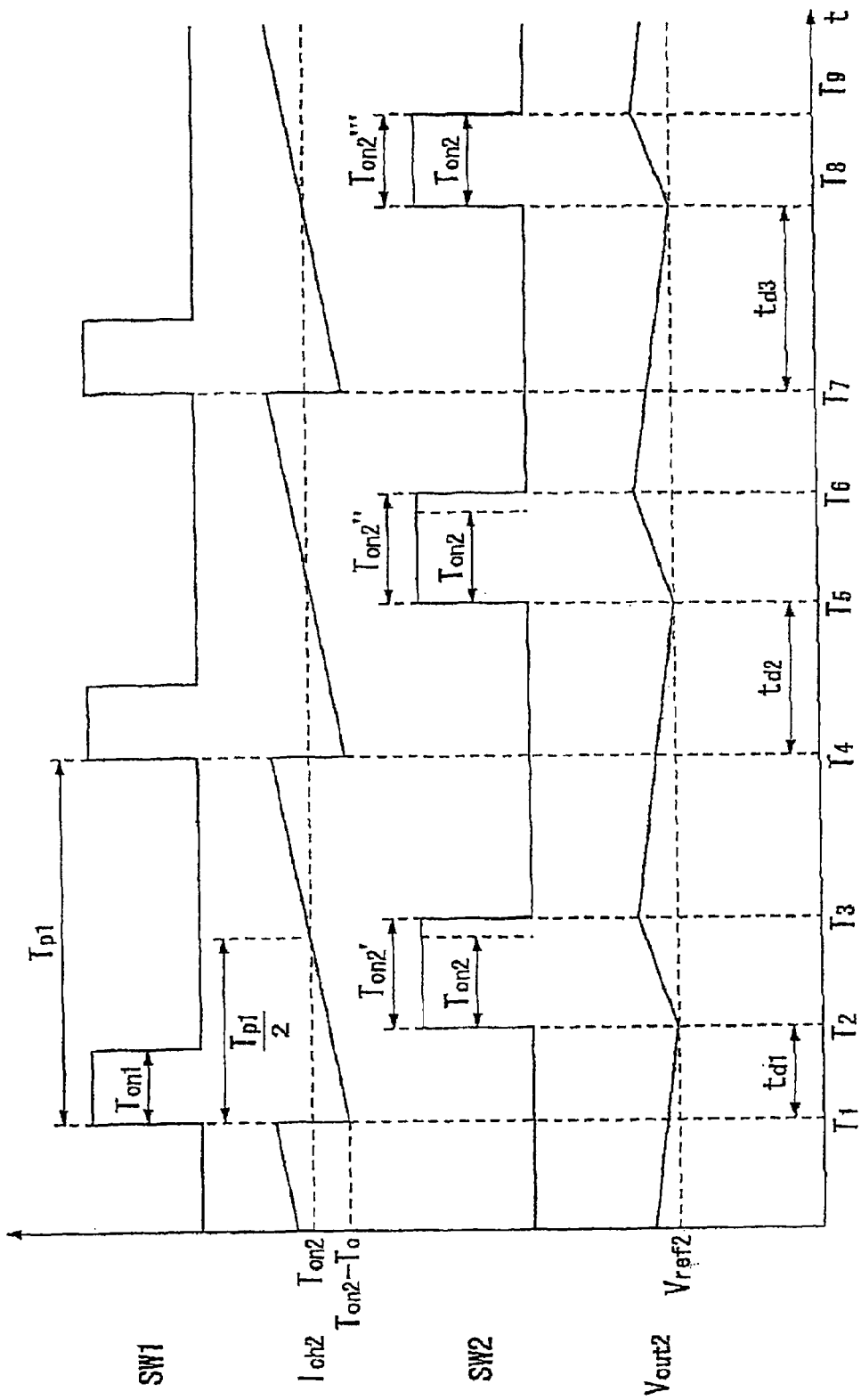
FIG. 7 is a time chart showing signal waveforms of the switching regulator in the case where the second on-time is corrected by the on-time correction circuit in the second on-time control circuit.

FIG. 7 is a time chart showing signal waveforms of the switching regulator 100 in the case of correcting second on-time by the on-time correction circuit 70 in the second on-time control circuit 44.

The first switching regulator 200 as the master channel is in the steady state in which the first output voltage Vout1 is stably output, and on-time and off time appear repeatedly at the duty ratio of 20%.

At time T1, the first switching signal SW1 is turned on. After that, when the second output voltage Vout2 drops to the second reference voltage Vref2 at time T2, the second switching signal SW2 is turned on. When the second switching signal SW2 is turned on, the corrected second on-time Ton2' of the second switching signal SW2 is determined by the second on-time control circuit 44 in the second switching signal generating circuit 20.

As described above, in the second on-time control circuit 44, when the first switching signal SW1 rises, the charging current Ich2 for charging the second capacitor C2 in the timer circuit 80 starts increasing gradually. At time T2 at which the second switching signal SW2 rises, the charging current Ich2 is smaller than the second constant current Ion2. As a result, time required to charge the second capacitor C2 to the fourth reference voltage Vref4, that is, the corrected second on-time Ton2' becomes longer than the reference second on-time Ton2. The second on-time control circuit 44 resets the second flip flop 42 and turns off the second switching signal SW2 at time T3 after a lapse of the corrected second on-time Ton2' since the second switching signal SW2 is turned on. During the on-time of the second switching signal SW2 from the time T2 to the time T3, the second output voltage Vout2 rises. When the second switching signal SW2 is turned off at the time T3, the second output voltage Vout2 starts dropping.

At time T4, the first switching signal SW1 is turned on again. During the time, the second output voltage Vout2 gradually decreases. At time T5 at which the second output voltage Vout2 drops to the second reference voltage Vref2, the second switching signal SW2 is turned on. Since the corrected second on-time Ton2' of last time was set to be longer than the reference second on-time Ton2, lapse time td2 from the rising edge of the first switching signal SW1 to the rising edge of the second switching signal SW2 becomes longer than the lapse time td1 of last time, and the rising of the second switching signal SW2 is delayed.

When the second switching signal SW2 is turned on at the time T5, the second on-time Ton2 is adjusted again by the second on-time control circuit 44. Since the charging current Ich2 at the time T5 at which the second switching signal SW2 rises is lower than the second constant current Ton2, the corrected second on-time Ton2' becomes longer than reference second on-time Ton2. The second switching signal SW2 is turned off at time T6.

The first switching signal SW1 is turned on again at time T7, and the second switching signal SW2 is turned on at time T8. By adjusting corrected second on-time Ton2" of last time, the lapse time td3 from the rising edge of the first switching signal SW1 to the rising edge of the second switching signal SW2 becomes longer than the lapse time td2.

The correction amount of the second on-time Ton2 is determined by the synchronous correction current Isync, and the synchronous correction current Isync is set to become zero after a lapse of the half of the first cycle time Tp1 from the first switching signal SW1. Therefore, the time of the rising edge of the second switching signal SW2 is gradually adjusted and converges to the time which is after a lapse of Tp1/2 from the rising edge of the first switching signal SW1.

As described above, in the switching regulator 100 according to the embodiment, the on-time Ton2 of the second switching signal SW2 is corrected according to the lapse time from the rising edge of the first switching signal SW1 to the rising edge of the second switching signal SW2, and the switching element is driven in accordance with the corrected on-time Ton2'. Consequently, the cycle time of the first switching signal SW1 and that of the second switching signal SW2 are brought close to each other and the first switching signal SW1 and second switching signal SW2 can be synchronized.

In the on-time correction circuit 70 in the second on-time control circuit 44, by setting the correction amount of the charging current Ich2 to zero at time after the half of the cycle time of the first switching signal SW1 from the rising edge of the first switching signal SW1, the on-time of the first switching signal SW1 and that of the second switching signal SW2 are shifted temporally. The first switching signal SW1 and second switching signal SW2 are repeatedly turned on/off while their phases shift from each other by 180 degrees.

As a result, the first switching signal SW1 and second switching signal SW2 can be prevented from being turned on at the same time, instantaneous increase in the input current flowing in the input terminal 102 is prevented, and the current capacitance of the power supply connected to the input terminal 102 can be reduced. Further, the capacitance of an input capacitor for smoothing which is connected to the input terminal 102 can be reduced or made unnecessary. In addition, since instantaneous increase in the input current can be suppressed, the influence of EMI on the circuit can be reduced, and the circuit can operate stably.

It is understood by a person skilled in the art that the embodiment is illustrative, the components and combinations of processes can be variously modified, and such modifications are within the scope of the present invention.

For example, in the first on-time control circuit 34 and second on-time control circuit 44 in the embodiment, the third reference voltages Vref3 and fourth reference voltage Vref4 are made proportional to the first reference voltage Vref1 and second reference voltage Vref2, respectively, and the first constant currents Ton1 and second constant current Ion2 are made proportional to the first reference voltage Vref1 and second reference voltage Vref2, respectively, so that the first cycle time Tp1 and the second cycle time Tp2 in the ideal state become equal to each other. In the present invention, however, it is not always necessary to set the first and second cycle times Tp1 and Tp2 to be equal to each other. Since the second on-time Ton2 of the second switching signal SW2 is corrected by feedback in the on-time correction circuit 70 in the second on-time control circuit 44, the two cycle times are brought close to each other, and a synchronization control can be performed.

Although a setting is made so that the synchronous correction current Isync becomes zero after the lapse of the half of the first cycle time Tp1 from the rising edge of the first switching signal SW1 in the foregoing embodiment, the setting does not always have to be made to the half of the cycle time. In the second on-time control circuit 44, the feedback control is performed so that the second switching signal SW2 is turned on when the synchronous correction current Isync becomes zero after the rising edge of the first switching signal. Therefore, by making a setting so that the synchronous correction current Isync becomes zero at time the second switching signal SW2 is desired to be turned on, the on-time can be arbitrarily shifted.

Although the case where the synchronous correction current Isync generated by the on-time correction circuit 70 depends on the lapse time td from the riding edge of the first switching signal and the charging current Ich2 also changes with time as shown in FIG. 5 has been described in the embodiment, the invention is not limited to the case. For example, the synchronous correction current Isync is specified as the function of the lapse time td as shown in FIG. 5, and the value of the synchronous correction current Isync at the rising time of the second switching signal SW2 is set as a synchronous correction current value. By adding the synchronous correction current value to the second constant current Ion2, the charge current Ich2 may be obtained. In this case as well, the corrected second on-time Ton2 is unconditionally determined for the lapse time td, the rising time of the second switching signal SW2 can be converged to time when the synchronous correction current Isync becomes zero by feedback, and the second switching signal SW2 can be synchronized with the first switching signal.

In the embodiment, the first on-time control circuit 34 and second on-time control circuit 44 for setting on-time of the first switching signals SW1 and second switching signal SW2, respectively, are formed by analog circuits. Alternately, the circuits may be formed by timer circuits of another form or digital circuits.

Also in the case where the second on-time control circuit 44 is formed by a digital circuit, it is sufficient to determine the second on-time Ton2 as the function of the lapse time td, and operations similar to those of the second on-time control circuit 44 according to the embodiment can be performed.

Although the switching regulator 100 having outputs of two channels has been described as an example in the embodiment, the invention can be also applied to a switching regulator having three channels of a master channel, a first slave channel, and a second slave channel.

In this case, the on-time correction circuit is provided for the on-time control circuit in each of the first slave channel and second slave channel, the switching signal of the first slave channel is controlled to rise after a lapse of ⅓ of the cycle time of a switching signal of the master channel from the rising edge of the switching signal, and a switching signal of the second slave channel is controlled to rise after a lapse of ⅔ of the cycle time. In such a manner, the number of channels can be increased.

In the embodiment, all of elements forming the switching regulator 100 may be integrated or formed in a plurality of integrated circuits. Further, a part of the elements may be a discrete part.

For example, the switching regulator control circuit 1000 of the embodiment may be integrated with the first switching element 12 and the second switching element 22. Which part is to be integrated may be determined in accordance with specifications, cost, occupation area, and the like requested for the circuit.

In the embodiment, the step-down switching regulator has been described. In the step-down switching regulator, the first synchronous rectifier transistor Tr2 and second synchronous rectifier transistor Tr4 may be rectifier diodes. The invention is not limited to the step-down switching regulator but can be also applied to a boosting switching regulator or boosting/step-down switching regulator. The invention can be also applied to a switched-capacitor-type DC/DC converter and can be widely applied to a power supply apparatus in which a switching element is switching-controlled by a pulse signal.

In the circuit configuration of each of the blocks in the embodiment, a MOSFET and a bipolar transistor can be freely replaced with each other. It is sufficient to determine which transistor to be used in accordance with design specifications requested for the circuit, semiconductor manufacturing processes used, and the like.

The invention can be applied also to a drive circuit for driving a motor by supplying a pulse signal to a switching transistor as a component of an H bridge circuit or the like. The invention can be widely applied to a control circuit for driving a switching element driven by pulse modulation.

While the preferred embodiments of the present invention have been described using specific terms, such description is for illustrative purposes only, and it is to be understood that changes and variations may be made without departing from the spirit or scope of the appended claims.

The invention claimed is:

1. A switching regulator control circuit comprising:
    a first output circuit arranged to output a first output voltage in response to a first switching pulse signal;
    a first switching signal generating circuit arranged to output the first switching pulse signal in response to the first output voltage;
    a second output circuit arranged to output a second output voltage in response to a second switching pulse signal; and
    a second switching signal generating circuit arranged to output the second switching pulse signal in response to the second output voltage and the first output voltage and arranged to change on-time of the second switching pulse signal in response to the first switching signal.

2. The switching regulator control circuit according to claim 1,
    the first switching signal generating circuit comprising:
    a first voltage comparator arranged to compare the first output voltage with a first reference voltage;
    a first on-time control circuit arranged to output a signal in response to the first switching pulse signal after a lapse of a first on-time; and
    a first flip-flop arranged to output the first switching pulse signal in response to the signal from the first voltage comparator and the signal from the first on-time control circuit.

3. The switching regulator control circuit according to claim 2,
    wherein the first flip-flop is set according to the signal from the first voltage comparator, and is reset according to the signal from the first on-time control circuit.

4. The switching regulator control circuit according to claim 1,
    the second switching signal generating circuit comprising:
    a second voltage comparator arranged to compare the second output voltage with a second reference voltage;
    a second on-time control circuit arranged to output a signal in response to the second switching pulse signal and the first switching pulse signal after a lapse of a second on-time; and
    a second flip-flop arranged to output the second switching pulse signal in response to the signal from the second voltage comparator and the signal from the second on-time control circuit.

5. The switching regulator control circuit according to claim 4,
    wherein the second flip-flop is set according to the signal from the second voltage comparator, and is reset according to the signal from the first on-time control circuit.

6. A switching regulator comprising the switching regulator control circuit according to claim 1, and a switching element turned on/off by the switching control circuit.

7. An electronic device comprising:
    a voltage source arranged to generate a predetermined DC voltage, and
    the switching regulator according to claim 6 arranged to boost or drop the predetermined DC voltage and arranged to output the resultant voltage to a load.

* * * * *